(12) United States Patent
Kobayashi et al.

(10) Patent No.: US 12,160,712 B2
(45) Date of Patent: Dec. 3, 2024

(54) AIR CONDITIONING DEVICE FOR VEHICLE

(71) Applicant: MITSUBISHI HEAVY INDUSTRIES THERMAL SYSTEMS, LTD., Tokyo (JP)

(72) Inventors: Takayuki Kobayashi, Tokyo (JP); Hirotaka Tanabe, Tokyo (JP); Tomoki Hase, Tokyo (JP); Masahiro Ohta, Tokyo (JP); Hideaki Tatenoi, Tokyo (JP); Koji Nakado, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 113 days.

(21) Appl. No.: 17/794,205

(22) PCT Filed: Feb. 1, 2021

(86) PCT No.: PCT/JP2021/003595
§ 371 (c)(1),
(2) Date: Jul. 20, 2022

(87) PCT Pub. No.: WO2021/153799
PCT Pub. Date: Aug. 5, 2021

(65) Prior Publication Data
US 2023/0347710 A1   Nov. 2, 2023

(30) Foreign Application Priority Data
Jan. 31, 2020  (JP) ................................. 2020-015517

(51) Int. Cl.
*B60H 1/32*  (2006.01)
*B60H 1/00*  (2006.01)
(Continued)

(52) U.S. Cl.
CPC ....... *H04R 29/001* (2013.01); *B60H 1/00485* (2013.01); *B60H 1/00899* (2013.01);
(Continued)

(58) Field of Classification Search
CPC ............ B60H 1/00485; B60H 1/00899; B60H 1/32284; B60H 2001/00961
See application file for complete search history.

(56) References Cited

U.S. PATENT DOCUMENTS 11,932,078 B2 * 3/2024 Pinto .................. B60H 1/00392
2016/0031288 A1 * 2/2016 Nishikawa ............. B60L 58/26
165/43

(Continued)

FOREIGN PATENT DOCUMENTS

DE    11 2014 001 830 T5    12/2015
DE    11 2014 001 870 T5    12/2015
(Continued)

OTHER PUBLICATIONS

International Search Report for International Application No. PCT/JP2021/003595, dated Mar. 30, 2021, with English translation.
(Continued)

*Primary Examiner* — Marc E Norman
(74) *Attorney, Agent, or Firm* — Birch, Stewart, Kolasch & Birch, LLP

(57) ABSTRACT

This air conditioning device for a vehicle comprises: a refrigeration cycle having a compressor, a condenser, an expansion valve, and an evaporator through which refrigerant sequentially flows; a high-temperature heat medium circuit in which a high-temperature heat medium that has been heat-exchanged with the refrigerant in the condenser circulates; a low-temperature heat medium circuit in which a low-temperature heat medium that has been heat-exchanged with the refrigerant in the evaporator circulates; a
(Continued)

connection line for connecting the high-temperature heat medium circuit and the low-temperature heat medium circuit; a plurality of heat exchangers outside the vehicle that allow introduction of the heat medium; and a switching unit capable of switching modes for each of the plurality of heat exchangers outside the vehicle, among a mode for connecting to the high-temperature heat medium circuit, a mode for connecting to the low-temperature heat medium circuit, and a mode for not connecting to either of the high-temperature heat medium circuit and the low-temperature heat medium circuit.

17 Claims, 8 Drawing Sheets

(51) Int. Cl.
| | | |
|---|---|---|
| *B64D 11/00* | (2006.01) | |
| *B64D 45/00* | (2006.01) | |
| *G01K 3/00* | (2006.01) | |
| *G01L 13/00* | (2006.01) | |
| *G08B 3/10* | (2006.01) | |
| *G10L 25/51* | (2013.01) | |
| *H04R 1/02* | (2006.01) | |
| *H04R 3/00* | (2006.01) | |
| *H04R 9/06* | (2006.01) | |
| *H04R 29/00* | (2006.01) | |
| *B64D 27/02* | (2006.01) | |
| *H04B 1/38* | (2015.01) | |

(52) U.S. Cl.
CPC ..... *B60H 1/32284* (2019.05); *B64D 11/0015* (2013.01); *B64D 45/00* (2013.01); *G01K 3/005* (2013.01); *G01L 13/00* (2013.01); *G08B 3/10* (2013.01); *G10L 25/51* (2013.01); *H04R 1/028* (2013.01); *H04R 3/00* (2013.01); *H04R 9/06* (2013.01); *B60H 2001/00961* (2019.05); *B64D 27/02* (2013.01); *H04B 1/38* (2013.01); *H04R 2430/01* (2013.01); *H04R 2499/13* (2013.01)

(56) References Cited

U.S. PATENT DOCUMENTS

| | | | |
|---|---|---|---|
| 2016/0031291 A1* | 2/2016 | Enomoto | B60K 11/02 |
| | | | 62/189 |
| 2016/0101666 A1 | 4/2016 | Sugimura et al. | |
| 2017/0253105 A1 | 9/2017 | Allgaeuer et al. | |
| 2018/0208014 A1 | 7/2018 | Ben Ahmed et al. | |
| 2018/0354344 A1 | 12/2018 | Miura et al. | |
| 2020/0164719 A1 | 5/2020 | Shiratori et al. | |
| 2020/0198443 A1 | 6/2020 | Kato et al. | |
| 2022/0134839 A1* | 5/2022 | He | B60H 1/00885 |
| | | | 165/203 |
| 2023/0082212 A1* | 3/2023 | Tanabe | B60H 1/00485 |
| | | | 165/202 |
| 2024/0034129 A1* | 2/2024 | Kim | B60H 1/00899 |
| 2024/0042828 A1* | 2/2024 | Liu | B60H 1/00485 |

FOREIGN PATENT DOCUMENTS

| | | |
|---|---|---|
| EP | 4 086 096 A1 | 11/2022 |
| JP | 50-101228 U | 8/1975 |
| JP | 2008-64381 A | 3/2008 |
| JP | 2013-193709 A | 9/2013 |
| JP | 2014-20280 A | 2/2014 |
| JP | 2014-234094 A | 12/2014 |
| JP | 2016-132429 A | 7/2016 |
| JP | 5949668 B2 | 7/2016 |
| JP | 2016-199203 A | 12/2016 |
| JP | 2017-8847 A | 1/2017 |
| JP | 2017-106693 A | 6/2017 |
| JP | 2017-210970 A | 11/2017 |
| JP | 2019-26111 A | 2/2019 |
| WO | WO 2019/058838 A1 | 3/2019 |

OTHER PUBLICATIONS

Written Opinion of the International Searching Authority for International Application No. PCT/JP2021/003595, dated Mar. 30, 2021, with English translation.

* cited by examiner

AIR CONDITIONING DEVICE FOR VEHICLE

TECHNICAL FIELD

The present disclosure relates to an air conditioning device for a vehicle.

This application claims the right of priority based on Japanese Patent Application No. 2020-15517 filed with the Japan Patent Office on Jan. 31, 2020, the content of which is incorporated herein by reference.

BACKGROUND ART

As an example of an air conditioning device for a vehicle that is mounted on a vehicle that includes an automobile or a truck, an air conditioning device described in PTL 1 below is known. The device described in PTL 1 has a compressor, an expansion valve, an evaporator (a heat medium cooler), and a condenser (a heat medium heater), and also includes a refrigerating cycle in which a refrigerant circulates, a first heat medium circuit that supplies a low-temperature heat medium to the evaporator to perform heat exchange between the refrigerant and the heat medium, and a second heat medium circuit that supplies a high-temperature heat medium to a cooling water heater to perform heat exchange between the refrigerant and the heat medium.

That is, each of the heat medium circuits is an independent circulation path with respect to the refrigerating cycle. In this way, it is said that it is possible to perform heat management of a vehicle while completing the refrigerating cycle outside a vehicle interior.

Incidentally, during an operation of the air conditioning device for a vehicle connected to a vehicle-exterior heat exchanger that performs heat exchanges between the heat medium and outside air (air outside the vehicle interior), in a case where the outside air temperature is equal to or higher than the freezing point and the temperature of the heat medium flowing in a radiator is equal to or lower than the freezing point, there is a case where moisture in the air condensed on the surface of the vehicle-exterior heat exchanger freezes and frost adheres (frost formation occurs). If the frost formation progresses, there is a concern that the ventilation performance of the radiator may be impaired. Therefore, in the device of PTL 1, a configuration is adopted in which in a case where the frost formation occurs, the frost is removed by supplying cooling water having a high temperature to the radiator.

CITATION LIST

Patent Literature

[PTL 1] Japanese Unexamined Patent Application Publication No. 2014-234094

SUMMARY OF INVENTION

Technical Problem

However, if a high-temperature heat medium is supplied to the radiator, the temperature of the heat medium becomes higher than the outside air temperature, so that heat cannot be absorbed from the outside air. In this way, there is a concern that heating operation by a heat pump cycle may not become possible.

The present disclosure has been made in order to solve the above problem, and has an object to provide an air conditioning device for a vehicle in which it is possible to achieve both defrosting and heating operation.

Solution to Problem

In order to solve the above problem, an air conditioning device for a vehicle according to the present disclosure includes: a refrigerating cycle having a compressor, a condenser, an expansion valve, and an evaporator through which a refrigerant sequentially flows; a high-temperature heat medium circuit in which a high-temperature heat medium that has been heat-exchanged with the refrigerant in the condenser circulates; a low-temperature heat medium circuit in which a low-temperature heat medium that has been heat-exchanged with the refrigerant in the evaporator circulates; a connection line that connects the high-temperature heat medium circuit and the low-temperature heat medium circuit; a plurality of vehicle-exterior heat exchangers into which the heat medium is capable of being introduced; and a switching part capable of switching, for each of the plurality of vehicle-exterior heat exchangers, between a mode of connecting to the high-temperature heat medium circuit, a mode of connecting to the low-temperature heat medium circuit, and a mode of not connecting to any of the high-temperature heat medium circuit and the low-temperature heat medium circuit.

Advantageous Effects of Invention

According to the air conditioning device for a vehicle of the present disclosure, it is possible to achieve both defrosting and heating operation.

DESCRIPTION OF EMBODIMENTS (Configuration of Air Conditioning Device for Vehicle)

Figure 1:
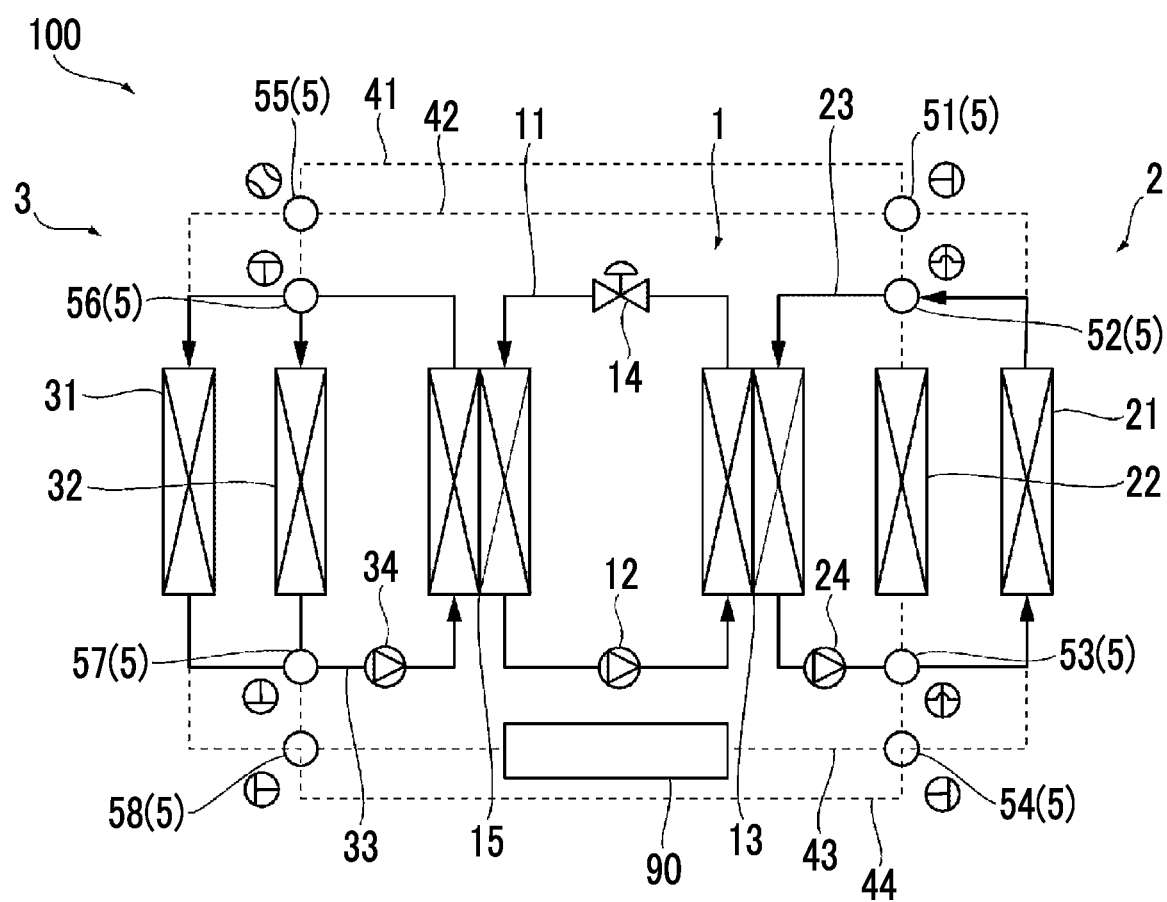
FIG. 1 is a system diagram showing a configuration of an air conditioning device for a vehicle according to an embodiment of the present disclosure, and is a diagram showing a state of being operated in a pure heating mode.
Figure 2:
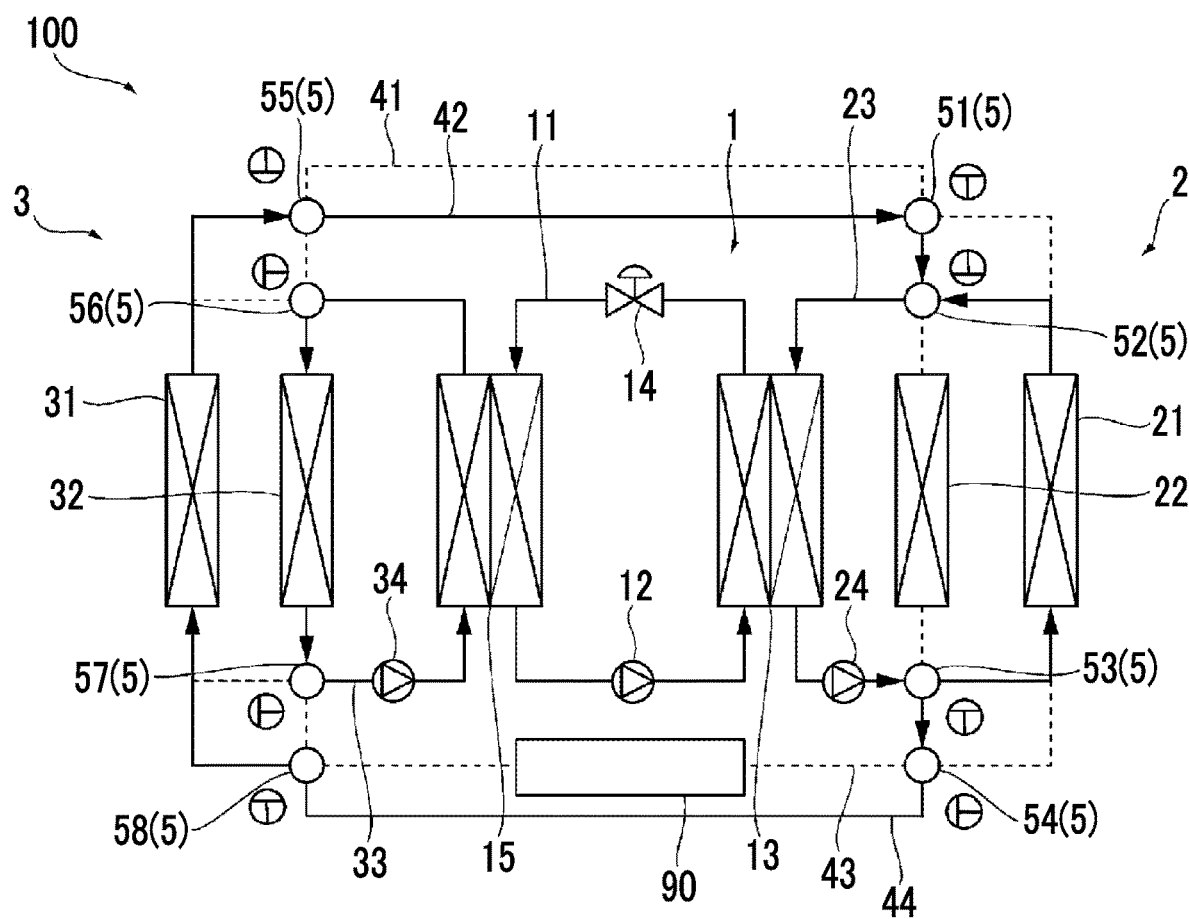
FIG. 2 is a system diagram showing the configuration of the air conditioning device for a vehicle according to the embodiment of the present disclosure, and is a diagram showing a state where a first vehicle-exterior heat exchanger is defrosted in a heating and defrosting mode.
Figure 3:
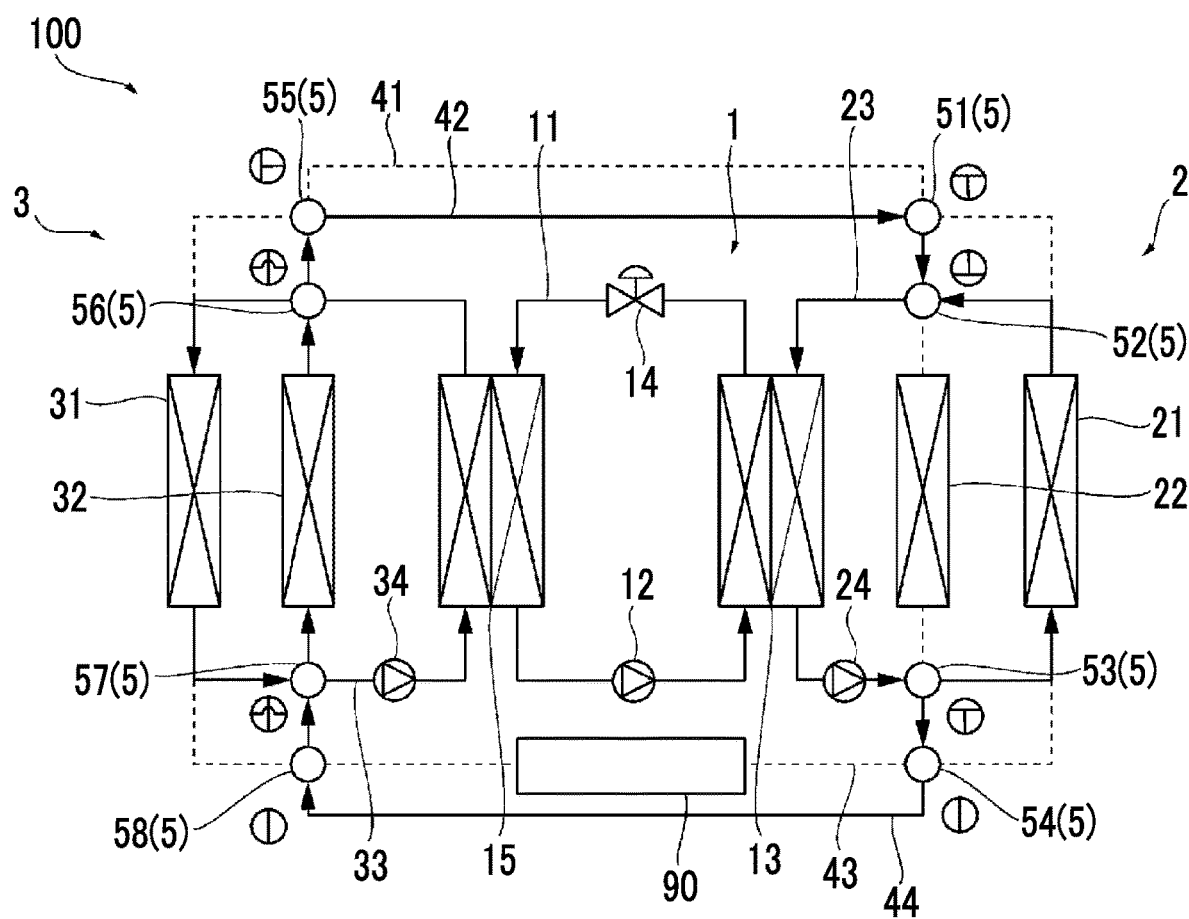
FIG. 3 is a system diagram showing the configuration of the air conditioning device for a vehicle according to the embodiment of the present disclosure, and is a diagram showing a state where a second vehicle-exterior heat exchanger is defrosted in the heating and defrosting mode.

Hereinafter, an air conditioning device for a vehicle 100 according to an embodiment of the present disclosure will be described with reference to FIGS. 1 to 13. The air conditioning device for a vehicle 100 is mounted on a transport machine (vehicle) such as an automobile or a truck. That is, a temperature difference between the inside and outside of a vehicle is adjusted by the air conditioning device for a vehicle 100. As shown in FIG. 1, the air conditioning device for a vehicle 100 includes a refrigerating cycle 1, a high-temperature heat medium circuit 2, a low-temperature heat medium circuit 3, a first connection line 41, a second connection line 42, a third connection line 43, a fourth connection line 44, and a switching part 5. In FIGS. 1 to 3, a pipe in an open state is shown by a solid line, and a pipe in a closed state is shown by a broken line.

The refrigerating cycle 1 has a refrigerant line 11 which is a pipe for causing a refrigerant to flow, and a compressor 12, a condenser 13, an expansion valve 14, and an evaporator 15 disposed on the refrigerant line 11. The compressor 12, the condenser 13, the expansion valve 14, and the evaporator 15 are arranged in this order on the refrigerant line 11. Further, in a case where the refrigerating cycle 1 is operated, the refrigerant also passes through the devices in this order.

The compressor 12 pumps the refrigerant in the refrigerant line 11. In this way, the pressure and temperature of the refrigerant after passing through the compressor 12 rise as compared with the refrigerant before passing through the compressor 12. The condenser 13 performs heat exchange between the refrigerant that has flowed into the condenser 13 and a heat medium (described later) that flows through the high-temperature heat medium circuit 2. The expansion valve 14 sharply lowers a temperature by reducing the pressure of the refrigerant passing through the expansion valve 14. The evaporator 15 performs heat exchange between the refrigerant that has flowed into the evaporator 15 and a heat medium (described later) that flows through the low-temperature heat medium circuit 3.

The high-temperature heat medium circuit 2 has a high-temperature heat medium line 23 that introduces cooling water into the condenser 13, a heater core 21 and a cooler core 22 that are disposed in parallel with each other on the high-temperature heat medium line 23, and a high-temperature heat medium pump 24 that pumps the heat medium. That is, the heat medium flowing out from the condenser 13 can be branched and flow toward each of the heater core 21 and the cooler core 22. The heater core 21 and the cooler core 22 are heat exchangers that are disposed on the indoor side of the vehicle. The heater core 21 and the cooler core 22 perform heat exchange between indoor air and outdoor air, and the heat medium. During heating operation, air is first cooled by the cooler core 22 to remove moisture, and then the air is heated by the heater core 21. In this way, operation to raise room temperature can be performed while suppressing a rise in humidity in the room.

The low-temperature heat medium circuit 3 has a low-temperature heat medium line 33 that introduces the heat medium into the evaporator 15, a first vehicle-exterior heat exchanger 31 and a second vehicle-exterior heat exchanger 32 that are disposed in parallel with each other on the low-temperature heat medium line 33, and a low-temperature heat medium pump 34 that pumps the heat medium. That is, the heat medium flowing out from the evaporator 15 can be branched and flow into each of the first vehicle-exterior heat exchanger 31 and the second vehicle-exterior heat exchanger 32. The first vehicle-exterior heat exchanger 31 and the second vehicle-exterior heat exchanger 32 are heat exchangers that are disposed on the outdoor side of the vehicle. The first vehicle-exterior heat exchanger 31 and the second vehicle-exterior heat exchanger 32 perform heat exchange between the outdoor air and the heat medium.

The first connection line 41 and the second connection line 42 are pipes connecting the high-temperature heat medium circuit 2 and the low-temperature heat medium circuit 3. That is, the heat medium flows through the first connection line 41 and the second connection line 42. The first connection line 41 and the second connection line 42 are in parallel with each other. That is, the high-temperature heat medium circuit 2 and the low-temperature heat medium circuit 3 can be connected by at least one of the first connection line 41 and the second connection line 42 according to an operation state (an operation mode) of the air conditioning device for a vehicle 100.

The third connection line 43 and the fourth connection line 44 are pipes connecting the high-temperature heat medium circuit 2 and the low-temperature heat medium circuit 3. That is, the heat medium flows through the third connection line 43 and the fourth connection line 44. The third connection line 43 and the fourth connection line 44 are in parallel with each other. That is, the high-temperature heat medium circuit 2 and the low-temperature heat medium circuit 3 can be connected by at least one of the third connection line 43 and the fourth connection line 44, in addition to at least one of the first connection line 41 and the second connection line 42, according to the operation state (the operation mode) of the air conditioning device for a vehicle 100. Further, in the present embodiment, in-vehicle equipment 90, which is auxiliary equipment of the vehicle, is disposed only on the third connection line 43. As an example of the in-vehicle equipment 90, specifically, a battery can be given.

The passage of the cooling water flowing through the high-temperature heat medium circuit 2, the low-temperature heat medium circuit 3, the first connection line 41, the second connection line 42, the third connection line 43, and the fourth connection line 44 can be switched by the switching part 5. In other words, the operating state (the operation mode) of the air conditioning device for a vehicle 100 can be switched by switching the flow passage of the cooling water.

The switching part 5 is a valve device (a switching valve) capable of switching the flow state of the heat medium between a plurality of flow paths to which the switching part 5 is connected. As shown in FIG. 1, in the present embodiment, one switching part 5 is provided for each of a plurality of (eight) connecting portions connecting the flow paths. Among these eight switching parts 5, the switching part 5 provided in the connecting portion on the side close to the cooler core 22, out of two connecting portions of the first connection line 41 and the second connection line 42, is regarded as a first valve device 51.

The switching parts 5 provided at two branch points between the heater core 21 and the cooler core 22 in the high-temperature heat medium circuit 2 are regarded as a second valve device 52 and a third valve device 53, respectively. The third valve device 53 is provided at the branch point on the side where the high-temperature heat medium pump 24 is provided, between the cooler core 22 and the condenser 13. The second valve device 52 is provided at the branch point on the side where the high-temperature heat medium pump 24 is not provided, between the cooler core 22 and the condenser 13.

The switching part 5 provided in the connecting portion on the side close to the cooler core 22, out of the two connecting portions of the third connection line 43 and the fourth connection line 44, is regarded as a fourth valve device 54.

Similarly, the switching part 5 provided in the connecting portion on the side close to the second vehicle-exterior heat exchanger 32, out of the two connecting portions of the first connection line 41 and the second connection line 42, is regarded as a fifth valve device 55.

The switching parts 5 provided at two branch points between the first vehicle-exterior heat exchanger 31 and the second vehicle-exterior heat exchanger 32 in the low-temperature heat medium circuit 3 are regarded as a sixth valve device 56 and a seventh valve device 57, respectively. The sixth valve device 56 is provided at the branch point on the side where the low-temperature heat medium pump 34 is provided, between the first vehicle-exterior heat exchanger 31 and the second vehicle-exterior heat exchanger 32. The seventh valve device 57 is provided at the branch point on the side where the low-temperature heat medium pump 34 is not provided, between the first vehicle-exterior heat exchanger 31 and the second vehicle-exterior heat exchanger 32.

The switching part 5 provided in the connecting portion on the side close to the second vehicle-exterior heat exchanger 32, out of the two connecting portions of the third connection line 43 and the fourth connection line 44, is regarded as an eighth valve device 58.

In FIGS. 1 to 3, a symbol attached in the vicinity of each switching part 5 indicates the open state of each switching part 5. Hereinafter, the specific configuration of the switching part 5 will be described with reference to FIGS. 4 to 13, and an example of the operation mode of the air conditioning device for a vehicle 100 will be described with reference to FIGS. 1 to 3 according to the open state represented by each symbol.

(Configuration of Switching Part)

Figure 4:
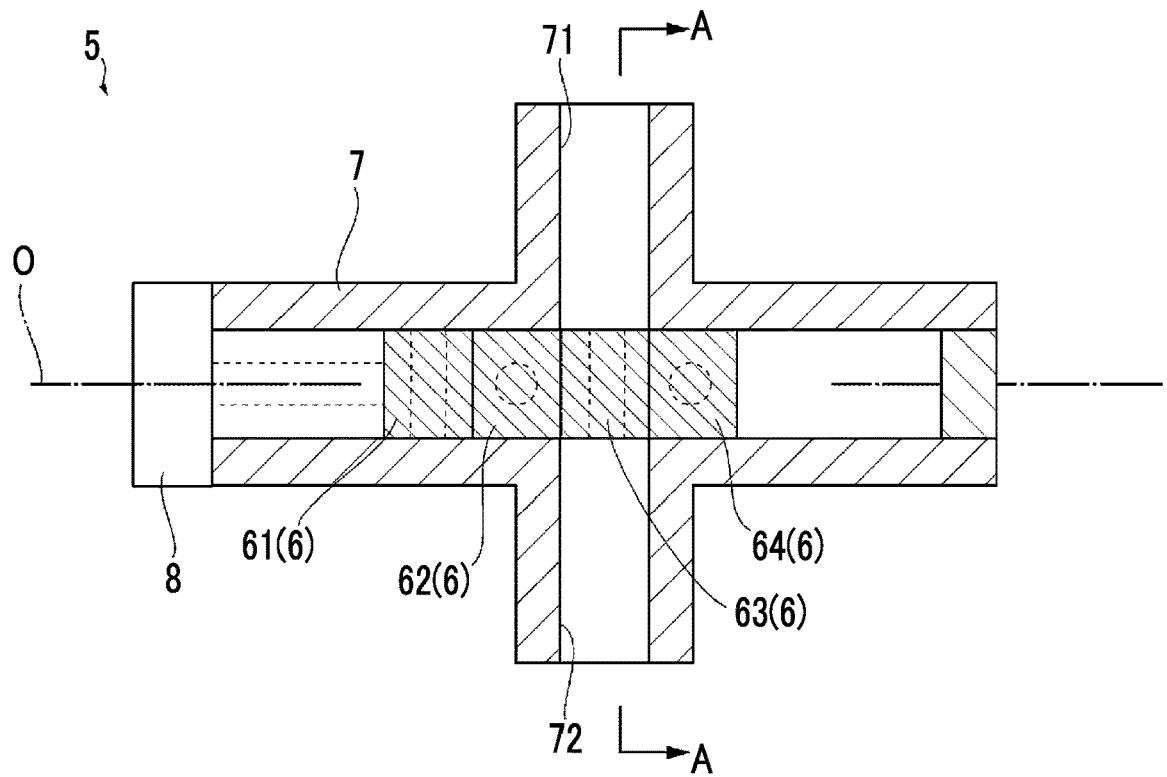
FIG. 4 is a sectional view showing a configuration of a valve device as a switching part according to the embodiment of the present disclosure.

As shown in FIG. 4, the switching part 5 has a plurality of (four) valve bodies 6, a valve casing 7 that accommodates the valve bodies 6 and is formed with a plurality of (four) flow paths 71, 72, 73, and 74, and an actuator 8 that drives the valve bodies 6.

Each valve body 6 has a columnar shape extending along an axis O. In the valve casing 7, the four valve bodies 6 are arranged in the direction of the axis O. Each valve body 6 is driven by the actuator 8, whereby each valve body 6 can advance and retreat along the axis O in the valve casing 7 and can rotate around the axis O. That is, by advancing and retreating the valve bodies 6 in the direction of the axis O, it becomes possible to selectively use any one of the four valve bodies 6 having different shapes. The detailed configuration of each valve body 6 will be described later.

Figure 5:
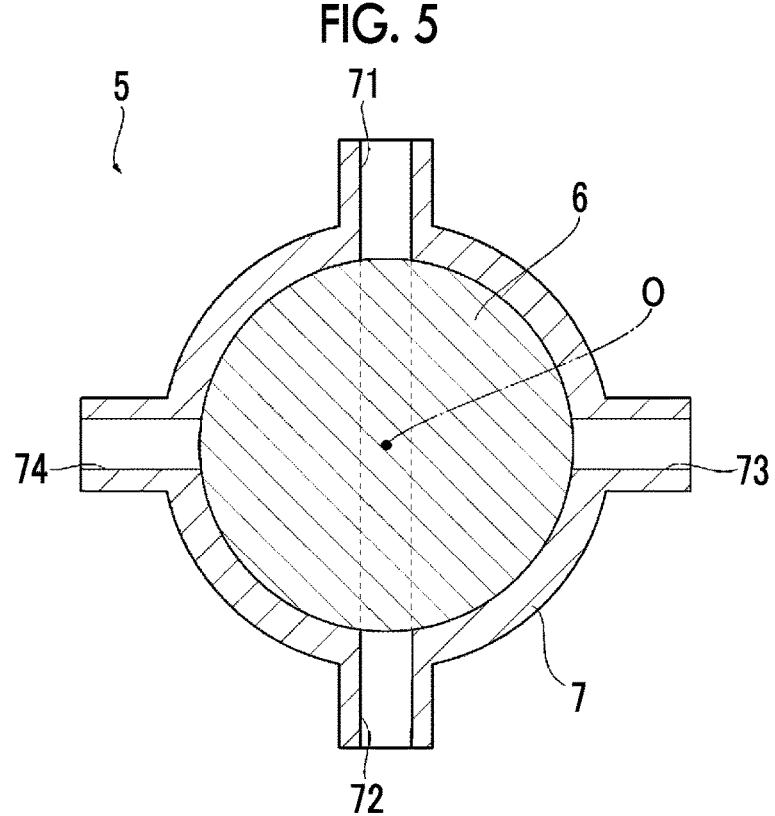
FIG. 5 is a sectional view taken along line A-A of FIG. 4 and viewed in the direction of an arrow.

The valve casing 7 has a tubular shape that covers the four valve bodies 6 from the outer periphery side with respect to the axis O. Further, as shown in FIG. 5, the valve casing 7 is formed with the four flow paths 71, 72, 73, and 74 communicating with at least one of the high-temperature heat medium circuit 2 and the low-temperature heat medium circuit 3 described above. Each of the flow paths 71, 72, 73, and 74 extends radially at an interval of 90° in a circumferential direction with the axis O as the center. The positions of the flow paths 71, 72, 73, and 74 in the direction of the axis O are equal to each other.

Figure 6:
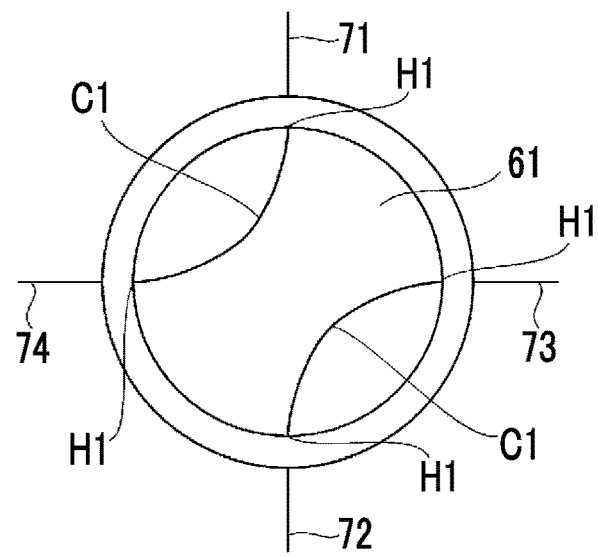
FIG. 6 is a schematic diagram showing a configuration of a first communication passage in a first valve body.
Figure 7:
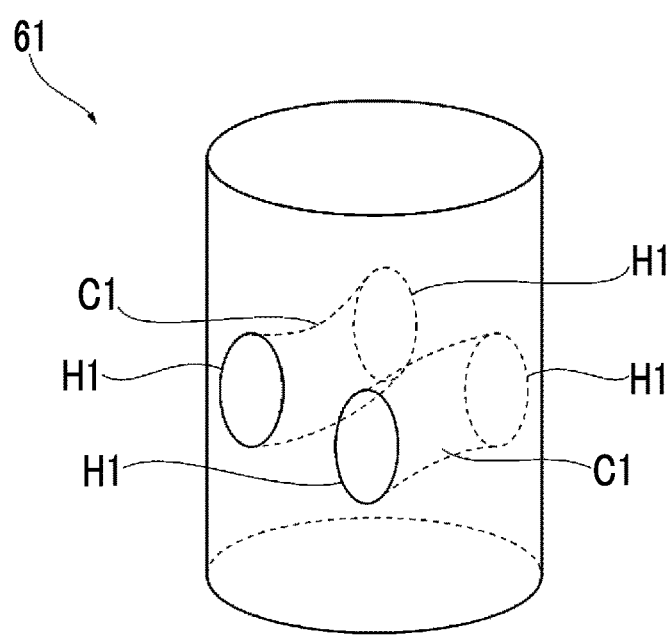
FIG. 7 is a perspective view showing a configuration of the first valve body.

As shown in FIGS. 6 and 7, one (a first valve body 61) of the four valve bodies 6 is formed with four opening portions (first opening portions H1) which are open in four directions at an interval of 90° in the circumferential direction with respect to the axis O. Further, a pair of first opening portions H1 adjacent to each other in the circumferential direction, among the four first opening portions H1, communicate with each other by a first communication passage C1 formed inside the first valve body 61. FIG. 6 schematically shows the shape of the first valve body 61, and corresponds to the symbol shown in FIGS. 1 to 3. For example, in the first valve device 51, a second valve body 62 is selected, and a state where the high-temperature heat medium circuit 2 communicates with the first connection line 41 and the second connection line 42 is created according to the posture of the second valve body 62. In the following description, the type and posture of the valve body 6 selected in this manner are shown by a symbol in FIGS. 1 to 3.

Figure 8:
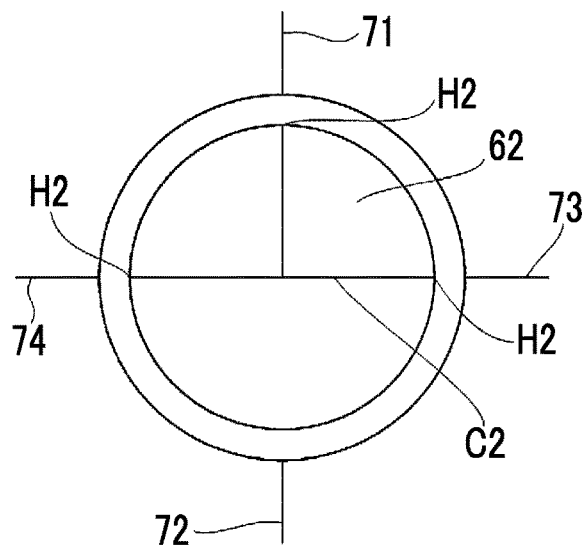
FIG. 8 is a schematic diagram showing a configuration of a second communication passage in a second valve body.
Figure 9:
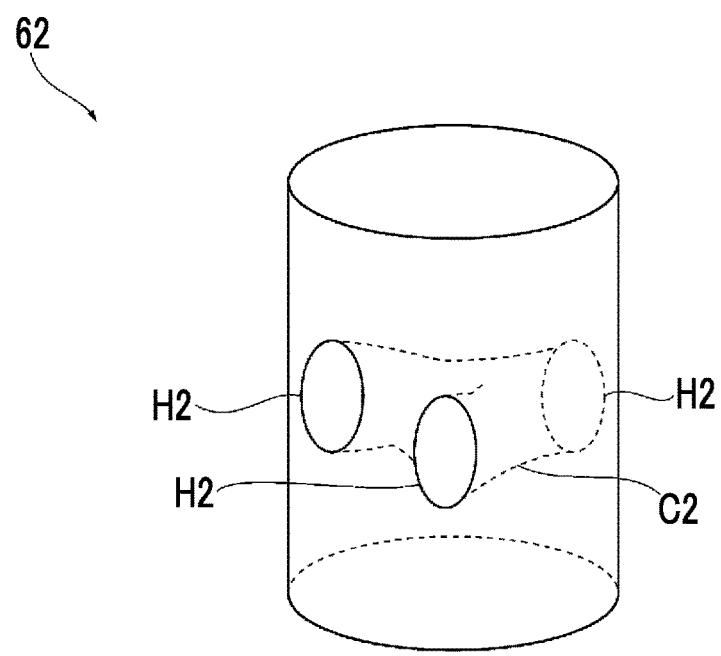
FIG. 9 is a perspective view showing a configuration of the second valve body.

As shown in FIGS. 8 and 9, one (the second valve body 62) of the four valve bodies 6 is formed with three opening portions (second opening portions H2) which are open in three directions at intervals in the circumferential direction with respect to the axis O. Further, the three second opening portions H2 communicate with each other by a second communication passage C2 formed inside the second valve body 62. The interval between the second opening portions H2 in the circumferential direction is not uniform. That is, the second communication passage C2 has a T-shape when viewed from the direction of the axis O. Therefore, a state is created where only any three flow paths among the four flow paths 71, 72, 73, and 74 communicate with each other by the second valve body 62. FIG. 8 schematically shows the shape of the second valve body 62, and corresponds to the symbol shown in FIGS. 1 to 3.

Figure 10:
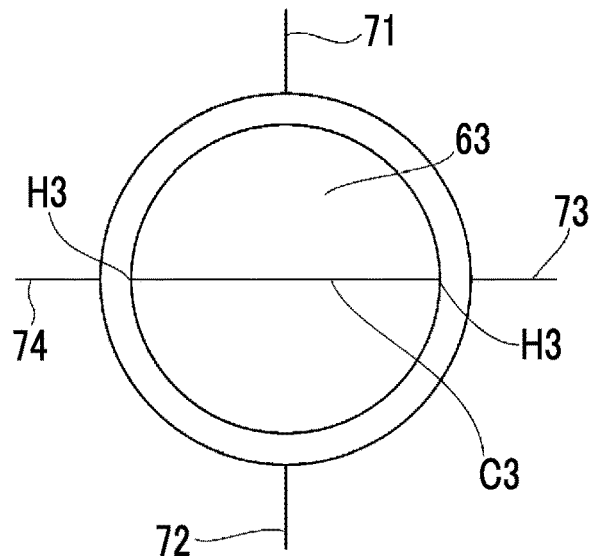
FIG. 10 is a schematic diagram showing a configuration of a third communication passage in a third valve body.
Figure 11:
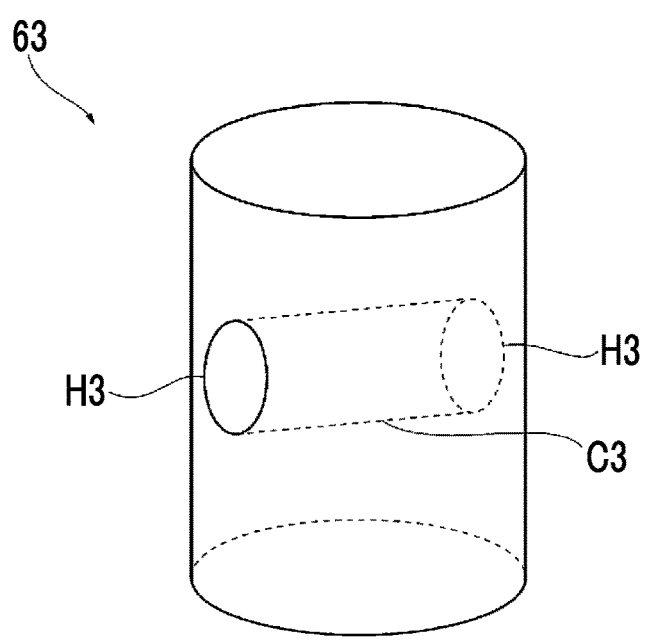
FIG. 11 is a perspective view showing a configuration of the third valve body.

As shown in FIGS. 10 and 11, one (a third valve body 63) of the four valve bodies 6 is formed with two opening portions (third opening portions H3) which are open in two directions at an interval of 180° in the circumferential direction with respect to the axis O. Further, the third opening portions H3 communicate with each other by a third communication passage C3 formed inside the third valve body 63. A state is created where only any two flow paths among the four flow paths 71, 72, 73, and 74 communicate with each other by the third valve body 63. FIG. 10 schematically shows the shape of the third valve body 63, and corresponds to the symbol shown in FIGS. 1 to 3.

Figure 12:
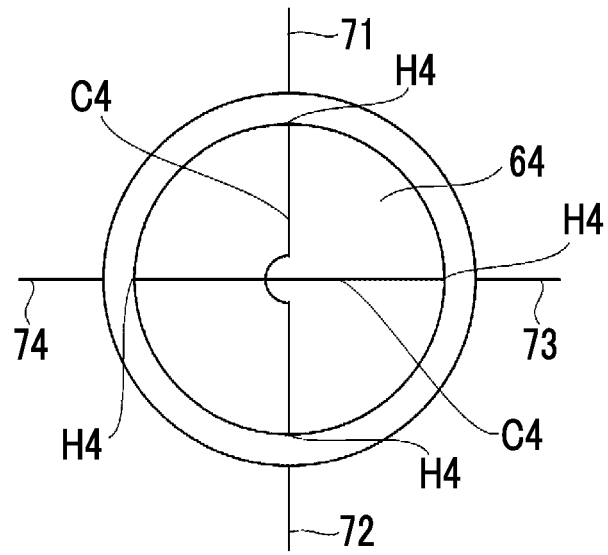
FIG. 12 is a schematic diagram showing a configuration of a fourth communication passage in a fourth valve body.
Figure 13:
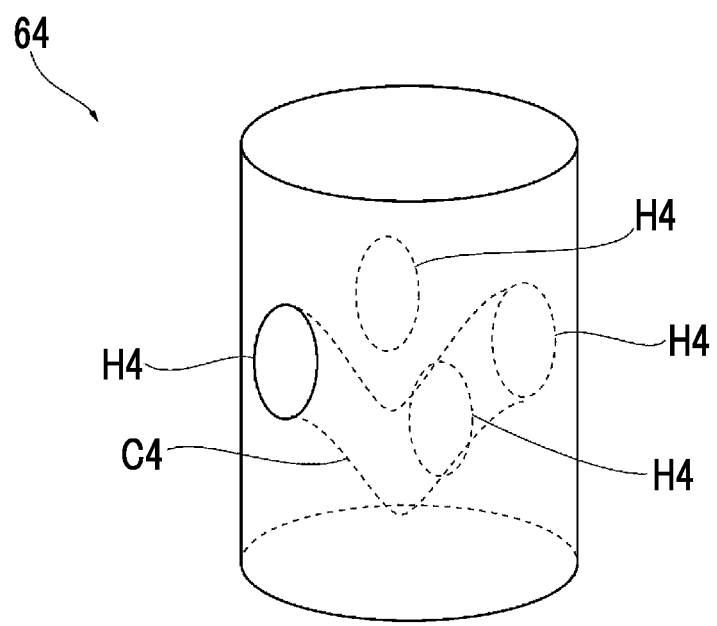
FIG. 13 is a perspective view showing a configuration of the fourth valve body.

As shown in FIGS. 12 and 13, one (a fourth valve body 64) of the four valve bodies 6 is formed with four opening portions (fourth opening portions H4) which are open in four directions at an interval of 90° in the circumferential direction with respect to the axis O. Further, a pair of fourth opening portions H4 located on both sides in a radial direction with respect to the axis O, among the four fourth opening portions H4, communicate with each other by a fourth communication passage C4 formed inside the fourth valve body 64. The two fourth communication passages C4 are curved inside the fourth valve body 64 so as not to interfere with each other in the direction of the axis O. In FIG. 13, in order to avoid complication of the illustration, only one fourth communication passage C4 is shown and the illustration of the other fourth communication passage C4 is omitted. A state is created where only any two flow paths among the four flow paths 71, 72, 73, and 74 communicate with each other by the fourth valve body 64. FIG. 12 schematically shows the shape of the fourth valve body 64, and corresponds to the symbol shown in FIGS. 1 to 3.

(Pure Heating Mode)

Next, an operation in the "pure heating mode", which is one of the operation modes of the air conditioning device for a vehicle 100, will be described with reference to FIG. 1. The flow passages of the refrigerant and the heat medium which are described below are realized by making each switching part 5 be in the state shown by the symbol in FIG. 1.

In the case of this mode, in the high-temperature heat medium circuit 2, the heat medium circulates from the high-temperature heat medium pump 24 toward the condenser 13 through the heater core 21. In the refrigerating cycle 1, heat exchange is performed between the refrigerant in the refrigerant line 11 and the heat medium in the high-temperature heat medium line 23. That is, the heat medium is heated by absorbing heat from the refrigerant in the condenser 13. The heat of the heated heat medium is radiated from the heater core 21 and sent as air blast into the room by an indoor fan (not shown) disposed in the vicinity of the cooler core 22.

Further, at this time, in the low-temperature heat medium circuit 3, the heat medium that has been heat-exchanged with the refrigerant in the evaporator 15 is introduced to both of the two vehicle-exterior heat exchangers (the first vehicle-exterior heat exchanger 31 and the second vehicle-exterior heat exchanger 32). That is, the refrigerant is heated by absorbing heat from the heat medium in the evaporator 15. The heat of the heated refrigerant is delivered to the heat medium flowing in the high-temperature heat medium circuit 2 in the above-mentioned condenser 13 through the refrigerating cycle 1 (the refrigerant line 11). In this manner, in the pure heating mode, heat exchange is promoted by introducing the heat medium into both of the two vehicle-exterior heat exchangers (the first vehicle-exterior heat exchanger 31 and the second vehicle-exterior heat exchanger 32), and thus the heating performance can be improved.

(Heating and Defrosting Mode)

Next, an operation in the "heating and defrosting mode", which is one of the operation modes of the air conditioning device for a vehicle 100, will be described with reference to FIG. 2. The flow passages of the refrigerant and the heat medium which are described below are realized by making each switching part 5 be in the state shown by the symbol in FIG. 2.

In the case of this mode, in the high-temperature heat medium circuit 2, similar to the pure heating mode, the heat medium circulates from the high-temperature heat medium pump 24 toward the condenser 13 through the heater core 21. In the refrigerating cycle 1, heat exchange is performed between the refrigerant in the refrigerant line 11 and the heat medium in the high-temperature heat medium line 23. That is, the heat medium is heated by absorbing heat from the refrigerant in the condenser 13. The heat of the heated cooling water is radiated from the heater core 21 and sent as air blast into the room by an indoor fan (not shown) disposed in the vicinity of the cooler core 22.

On the other hand, in the low-temperature heat medium circuit 3, the low-temperature heat medium that has been heat-exchanged with the refrigerant in the evaporator 15 is introduced into only the vehicle-exterior heat exchanger on one side (the second vehicle-exterior heat exchanger 32). At this time, similar to the heating mode described above, the refrigerant is heated by absorbing heat from the low-temperature heat medium in the evaporator 15. The heat of the heated refrigerant is delivered to the heat medium flowing in the high-temperature heat medium circuit in the above-mentioned condenser 13 through the refrigerating cycle 1 (the refrigerant line 11). Further, the (remaining) vehicle-exterior heat exchanger on the other side (the first vehicle-exterior heat exchanger 31) is connected to the high-temperature heat medium circuit 2 by the above-mentioned second connection line 42 and fourth connection line 44. In this way, the heat medium having a relatively high temperature, which flows through the high-temperature heat medium circuit 2, flows into the first vehicle-exterior heat exchanger 31 through the fourth connection line 44. In a case where frost is stuck to the surface of the first vehicle-exterior heat exchanger 31 (in a case where frost is formed), the first vehicle-exterior heat exchanger 31 is heated by the high-temperature heat medium, so that the frost is removed. Thereafter, the high-temperature heat medium is returned to the high-temperature heat medium circuit 2 through the second connection line 42.

By adopting the passage shown in FIG. 3, contrary to the above, it is also possible to perform heating in the first vehicle-exterior heat exchanger 31 and perform defrosting in the second vehicle-exterior heat exchanger 32. In this manner, in the heating and defrosting mode, it is possible to perform the defrosting in one of the first vehicle-exterior heat exchanger 31 and the second vehicle-exterior heat exchanger 32 and simultaneously perform the heating in the other.

(Operation and Effects)

As described above, according to the present embodiment, in the pure heating mode, by introducing the heat medium into both the first and second vehicle-exterior heat exchangers 31 and 32, it is possible to improve the heating performance as compared with, for example, a configuration in which only one vehicle-exterior heat exchanger is provided. Further, in the heating and defrosting mode, the heat medium is introduced into only one of the vehicle-exterior heat exchangers, and the remaining vehicle-exterior heat exchanger is in a state of being connected to the high-temperature heat medium circuit 2. Here, the heat medium flowing through the high-temperature heat medium circuit 2 has a temperature that is relatively high compared to the heat medium flowing through the low-temperature heat medium circuit 3 and the remaining vehicle-exterior heat exchanger and is higher than the freezing point of water. Therefore, in a case where frost is formed on the remaining vehicle-exterior heat exchanger, it is possible to perform defrosting with the high-temperature heat medium. In this manner, it is possible to achieve both the heating operation by the vehicle-exterior heat exchanger on one side and the defrosting by the vehicle-exterior heat exchanger on the other side.

Further, according to the above configuration, the heating performance can be further improved because the temperature of the heat medium that is introduced into all the vehicle-exterior heat exchangers is lower than the outside air temperature.

Further, according to the above configuration, it is possible to more quickly and efficiently perform defrosting in the remaining vehicle-exterior heat exchanger because the temperature of the heat medium that is introduced into the remaining vehicle-exterior heat exchanger is higher than the outside air temperature and higher than the freezing point of water.

In addition, according to the above configuration, by advancing and retreating the plurality of valve bodies 6 in the direction of the axis O in the valve casing 7 or rotating the valve bodies 6 around the axis O, it is possible to switch between the communication states of the plurality of flow paths 71, 72, 73, and 74. In particular, the valve devices (the switching parts 5) that are required to be a plurality can be unified into only one configuration. Further, since the number of connection points can be easily increased, the expandability of the device can be secured. Further, it is possible to omit a step of selecting and mounting an appropriate type from a plurality of types of valve devices at the time of manufacturing. As a result, it is possible to reduce manufacturing costs or maintenance costs.

According to the above configuration, by the first valve body 61, it is possible to make a pair of flow paths adjacent to each other, among the four flow paths 71, 72, 73, and 74, communicate with each other by the first communication passage C1. Further, by rotating the first valve body 61 around the axis O, it is possible to selectively make two flow paths among the four flow paths 71, 72, 73, and 74 communicate with each other. In this way, it is possible to switch between the communication states of the flow paths 71, 72, 73, and 74 with a high degree of freedom.

According to the above configuration, by the second valve body 62, it is possible to make three flow paths among the four flow paths 71, 72, 73, and 74 communicate with each other by the second communication passage C2. Further, by rotating the second valve body 62 around the axis O, it is possible to selectively make three flow paths among the four flow paths 71, 72, 73, and 74 communicate with each other. In this way, it is possible to switch between the communication states of the flow paths 71, 72, 73, and 74 with a high degree of freedom.

According to the above configuration, by the third valve body 63, it is possible to make two flow paths among the four flow paths 71, 72, 73, and 74 communicate with each other by the third communication passage C3. Further, by rotating the third valve body 63 around the axis O, it is possible to selectively make two flow paths among the four flow paths 71, 72, 73, and 74 communicate with each other. In this way, it is possible to switch between the communication states of the flow paths 71, 72, 73, and 74 with a high degree of freedom.

According to the above configuration, by the fourth valve body 64, it is possible to make two flow paths located on both sides in the radial direction, among the four flow paths 71, 72, 73, and 74, communicate with each other by the fourth communication passage C4. Further, by rotating the fourth valve body 64 around the axis O, it is possible to selectively make two flow paths among the four flow paths 71, 72, 73, and 74 communicate with each other. In this way, it is possible to switch between the communication states of the flow paths 71, 72, 73, and 74 with a high degree of freedom.

OTHER EMBODIMENTS

The embodiment of the present disclosure has been described in detail above with reference to the drawings. The specific configuration is not limited to the above embodiment, and also includes design changes or the like within a scope which does not depart from the gist of the present disclosure. For example, in the air conditioning device for a vehicle 100 described above, by appropriately switching the state of each switching part 5, it is possible to perform operation not only in the pure heating mode and the heating and defrosting mode but also in other modes including a cooling mode and the like.

<Additional Remark>

The air conditioning device for a vehicle in each embodiment is grasped as follows, for example.

(1) The air conditioning device for a vehicle 100 according to a first aspect includes: the refrigerating cycle 1 having the compressor 12, the condenser 13, the expansion valve 14, and the evaporator 15 through which a refrigerant sequentially flows; the high-temperature heat medium circuit 2 in which a high-temperature heat medium that has been heat-exchanged with the refrigerant in the condenser 13 circulates; the low-temperature heat medium circuit 3 in which a low-temperature heat medium that has been heat-exchanged with the refrigerant in the evaporator 15 circulates; the connection lines 41, 42, 43, and 44 that connect the high-temperature heat medium circuit and the low-temperature heat medium circuit; the plurality of vehicle-interior heat exchangers 21 and 22 into which the heat medium can be introduced, the plurality of vehicle-exterior heat exchangers 31 and 32 into which the heat medium can be introduced; and the switching part 5 capable of switching, for each of the plurality of vehicle-exterior heat exchangers, between a mode of connecting to the high-temperature heat medium circuit, a mode of connecting to the low-temperature heat medium circuit, and a mode of not connecting to any of the high-temperature heat medium circuit and the low-temperature heat medium circuit.

According to the above configuration, in the pure heating mode, by introducing cooling water into both the first and second vehicle-exterior heat exchangers 31 and 32, it is possible to improve the heating performance as compared with, for example, a configuration in which only one vehicle-exterior heat exchanger is provided. Further, in the heating and defrosting mode, a low-temperature heat medium is introduced into only one of the vehicle-exterior heat exchangers 31 and 32, and the remaining vehicle-exterior heat exchanger 31 or 32 is in a state of being connected to the high-temperature heat medium circuit 2. Here, a high-temperature heat medium flowing through the high-temperature heat medium circuit 2 has a temperature that is relatively high compared to the low-temperature heat medium flowing through the low-temperature heat medium circuit 3 and the remaining vehicle-exterior heat exchanger 31 or 32. Therefore, in a case where frost is formed on the remaining vehicle-exterior heat exchanger 31 or 32, it is possible to perform the defrosting with the high-temperature heat medium. In this manner, according to the above configuration, it is possible to achieve both the heating operation by one vehicle-exterior heat exchanger 31 or 32 and the defrosting by the other vehicle-exterior heat exchanger 32 or 31.

(2) In the air conditioning device for a vehicle 100 according to a second aspect, the refrigerating cycle 1 adjusts, in the pure heating mode, the temperature of the refrigerant so as to create a state where the temperature of the heat medium that performs heat exchange with the refrigerant in both the vehicle-exterior heat exchangers 31 and 32 is lower than an outside air temperature.

According to the above configuration, the heating performance can be further improved because the temperature of the heat medium that is introduced into both the vehicle-exterior heat exchangers 31 and 32 is lower than the outside air temperature.

(3) In the air conditioning device for a vehicle 100 according to a third aspect, the refrigerating cycle 1 adjusts, in the heating and defrosting mode, the temperature of the refrigerant so as to create a state where the temperature of the heat medium that performs heat exchange with the refrigerant in the remaining vehicle-exterior heat exchanger 31 or 32 is higher than the freezing point of water.

According to the above configuration, it is possible to more quickly and efficiently perform the defrosting in the remaining vehicle-exterior heat exchanger 31 or 32 because the temperature of the heat medium that is introduced into the remaining vehicle-exterior heat exchanger 31 or 32 is higher than the freezing point of water.

(4) In the air conditioning device for a vehicle 100 according to a fourth aspect, the switching part 5 is a plurality of valve devices capable of changing the flow states in the high-temperature heat medium circuit 2 and the low-temperature heat medium circuit 3, and includes the plurality of valve bodies 6, each of which has a columnar shape centered on the axis O, and which are arranged in the direction of the axis O and are rotatable around the axis O, the valve casing 7 that covers the plurality of valve bodies and is provided with the four flow paths 71, 72, 73, and 74 that communicate with at least one of the high-temperature heat medium circuit 2 and the low-temperature heat medium circuit 3, and the actuator 8 that advances and retreats the plurality of valve bodies 6 in the direction of the axis O in the valve casing 7 and rotates the plurality of valve bodies 6 around the axis O.

According to the above configuration, by advancing and retreating the plurality of valve bodies 6 in the direction of the axis O in the valve casing 7 or rotating the valve bodies 6 around the axis O, it is possible to switch between the communication states of the plurality of flow paths 71, 72, 73, and 74. In particular, the valve devices that are required to be a plurality can be unified into only one configuration. Further, since the number of connection points can be easily increased, the expandability of the device can be secured. Further, it is possible to omit a step of selecting and mounting an appropriate type from a plurality of types of valve devices at the time of manufacturing. As a result, it is possible to reduce manufacturing costs or maintenance costs.

(5) In the air conditioning device for a vehicle 100 according to a fifth aspect, one of the plurality of valve bodies 6 is the first valve body 61 in which the first opening portions H1 that are open in four directions at intervals in the circumferential direction with respect to the axis O are formed and the first communication passage C1 making a pair of the first opening portions H1 adjacent to each other in the circumferential direction communicate with each other inside the valve body 6 is formed.

According to the above configuration, it is possible to make a pair of flow paths adjacent to each other, among the four flow paths 71, 72, 73, and 74, communicate with each other by the first communication passage C1. Further, by rotating the first valve body 61 around the axis O, it is possible to selectively make two flow paths among the four flow paths 71, 72, 73, and 74 communicate with each other. In this way, it is possible to switch between the communication states of the flow paths 71, 72, 73, and 74 with a high degree of freedom.

(6) In the air conditioning device for a vehicle 100 according to a sixth aspect, one of the plurality of valve bodies 6 is the second valve body 62 in which the second opening portions H2 that are open in three directions at intervals in the circumferential direction with respect to the axis O are formed and the second communication passage C2 making the three second opening portions H2 communicate with each other inside the valve body 6 is formed.

According to the above configuration, it is possible to make three flow paths among the four flow paths 71, 72, 73, and 74 communicate with each other by the second communication passage C2. Further, by rotating the second valve body 62 around the axis O, it is possible to selectively make three flow paths among the four flow paths 71, 72, 73, and 74 communicate with each other. In this way, it is possible to switch between the communication states of the flow paths 71, 72, 73, and 74 with a high degree of freedom.

(7) In the air conditioning device for a vehicle 100 according to a seventh aspect, one of the plurality of valve bodies 6 is the third valve body 63 in which the third opening portions H3 that are open in two directions at an interval in the circumferential direction with respect to the axis O are formed and the third communication passage C3 making the two third opening portions H3 communicate with each other inside the valve body 6 is formed.

According to the above configuration, it is possible to make two flow paths among the four flow paths 71, 72, 73, and 74 communicate with each other by the third communication passage C3. Further, by rotating the third valve body 63 around the axis O, it is possible to selectively make two flow paths among the four flow paths 71, 72, 73, and 74 communicate with each other. In this way, it is possible to switch between the communication states of the flow paths 71, 72, 73, and 74 with a high degree of freedom.

(8) In the air conditioning device for a vehicle 100 according to an eighth aspect, one of the plurality of valve bodies 6 is the fourth valve body 64 in which the fourth opening portions H4 that are open in four directions at intervals in the circumferential direction with respect to the axis O are formed and the fourth communication passage C4 making a pair of the fourth opening portions H4 located on both sides in the radial direction with respect to the axis O communicate with each other inside the valve body is formed.

According to the above configuration, it is possible to make two flow paths located on both sides in the radial direction, among the four flow paths 71, 72, 73, and 74, communicate with each other by the fourth communication passage C4. Further, by rotating the fourth valve body 64 around the axis O, it is possible to selectively make two flow paths among the four flow paths 71, 72, 73, and 74 communicate with each other. In this way, it is possible to switch between the communication states of the flow paths 71, 72, 73, and 74 with a high degree of freedom.

REFERENCE SIGNS LIST 100 air conditioning device for vehicle
1 refrigerating cycle
2 high-temperature heat medium circuit
3 low-temperature heat medium circuit
5 switching part
6 valve body
7 valve casing
8 actuator
11 refrigerant line
12 compressor
13 condenser
14 expansion valve
15 evaporator
21 heater core
22 cooler core
23 high-temperature heat medium line
24 high-temperature heat medium pump
31 first vehicle-exterior heat exchanger
32 second vehicle-exterior heat exchanger
33 low-temperature heat medium line 34 low-temperature heat medium pump
41 first connection line
42 second connection line
43 third connection line
44 fourth connection line
51 first valve device
52 second valve device
53 third valve device
54 fourth valve device
55 fifth valve device
56 sixth valve device
57 seventh valve device
58 eighth valve device
61 first valve body
62 second valve body
63 third valve body
64 fourth valve body
71, 72, 73, 74 flow path
90 in-vehicle equipment
C1 first communication passage
C2 second communication passage
C3 third communication passage
C4 fourth communication passage
H1 first opening portion
H2 second opening portion
H3 third opening portion
H4 fourth opening portion
O axis

The invention claimed is:

1. An air conditioning device for a vehicle comprising:
a refrigerating cycle having a compressor, a condenser, an expansion valve, and an evaporator through which a refrigerant sequentially flows;
a high-temperature heat medium circuit in which a high-temperature heat medium that has been heat-exchanged with the refrigerant in the condenser circulates;
a low-temperature heat medium circuit in which a low-temperature heat medium that has been heat-exchanged with the refrigerant in the evaporator circulates;
a connection line that connects the high-temperature heat medium circuit and the low-temperature heat medium circuit;
a plurality of vehicle-exterior heat exchangers into which the high-temperature heat medium and/or the low-temperature heat medium are capable of being introduced; and
a switching part configured to switch, for each of the plurality of vehicle-exterior heat exchangers, between a mode of connecting to the high-temperature heat medium circuit, a mode of connecting to the low-temperature heat medium circuit, and a mode of not connecting to any of the high-temperature heat medium circuit and the low-temperature heat medium circuit.

2. The air conditioning device for a vehicle according to claim 1,
wherein the refrigerating cycle adjusts, in a pure heating mode, a temperature of the refrigerant to create a state where a temperature of the low-temperature heat medium in the vehicle-exterior heat exchangers is lower than an outside air temperature, the low-temperature heat medium performing heat exchange with the refrigerant in the evaporator and being introduced to all the vehicle-exterior heat exchangers.

3. The air conditioning device for a vehicle according to claim 2,
wherein the refrigerating cycle adjusts, in a heating and defrosting mode, a temperature of the refrigerant to create a state where a temperature of the high-temperature heat medium in the vehicle-exterior heat exchanger is higher than a freezing point of water, the high-temperature heat medium performing heat exchange with the refrigerant in the condenser and being introduced to at least one of the vehicle-exterior heat exchangers excluding one of the vehicle-exterior heat exchangers.

4. The air conditioning device for a vehicle according to claim 2,
wherein the switching part is a plurality of valve devices capable of changing a flow state in the high-temperature heat medium circuit and the low-temperature heat medium circuit, and includes
a plurality of valve bodies, each of which has a columnar shape centered on an axis, and which are arranged in a direction of the axis and are rotatable around the axis,
a valve casing that covers the plurality of valve bodies and is provided with four flow paths that communicate with at least one of the high-temperature heat medium circuit and the low-temperature heat medium circuit, and
an actuator that advances and retreats the plurality of valve bodies in the direction of the axis in the valve casing and rotates the plurality of valve bodies around the axis.

5. The air conditioning device for a vehicle according to claim 1,
wherein the refrigerating cycle adjusts, in a heating and defrosting mode, a temperature of the refrigerant to create a state where a temperature of the high-temperature heat medium the vehicle-exterior heat exchanger is higher than a freezing point of water, the high-temperature heat medium performing heat exchange with the refrigerant in the condenser and being introduced to at least one of the vehicle-exterior heat exchangers excluding one of the vehicle-exterior heat exchanger.

6. The air conditioning device for a vehicle according to claim 5,
wherein the switching part is a plurality of valve devices capable of changing a flow state in the high-temperature heat medium circuit and the low-temperature heat medium circuit, and includes
a plurality of valve bodies, each of which has a columnar shape centered on an axis, and which are arranged in a direction of the axis and are rotatable around the axis,
a valve casing that covers the plurality of valve bodies and is provided with four flow paths that communicate with at least one of the high-temperature heat medium circuit and the low-temperature heat medium circuit, and
an actuator that advances and retreats the plurality of valve bodies in the direction of the axis in the valve casing and rotates the plurality of valve bodies around the axis.

7. The air conditioning device for a vehicle according to claim 1,
wherein the switching part is a plurality of valve devices capable of changing a flow state in the high-temperature heat medium circuit and the low-temperature heat medium circuit, and includes
a plurality of valve bodies, each of which has a columnar shape centered on an axis, and which are arranged in a direction of the axis and are rotatable around the axis,
a valve casing that covers the plurality of valve bodies and is provided with four flow paths that communicate with at least one of the high-temperature heat medium circuit and the low-temperature heat medium circuit, and an actuator that advances and retreats the plurality of valve bodies in the direction of the axis in the valve casing and rotates the plurality of valve bodies around the axis.

8. The air conditioning device for a vehicle according to claim 7, wherein one of the plurality of valve bodies is an adjacent two-by-two valve body in which adjacent opening portions that are open in four directions at intervals in a circumferential direction with respect to the axis are formed and a communication passage making a pair of the adjacent opening portions adjacent to each other in the circumferential direction communicate with each other inside the valve body is formed.

9. The air conditioning device for a vehicle according to claim 8, wherein one of the plurality of valve bodies is a three-way valve body in which three opening portions that are open in three directions at intervals in a circumferential direction with respect to the axis are formed and a communication passage making the three opening portions communicate with each other inside the valve body is formed.

10. The air conditioning device for a vehicle according to claim 8, wherein one of the plurality of valve bodies is a two-way valve body in which two opening portions that are open in two directions at an interval in a circumferential direction with respect to the axis are formed and a communication passage making the two third opening portions communicate with each other inside the valve body is formed.

11. The air conditioning device for a vehicle according to claim 8, wherein one of the plurality of valve bodies is an opposing two-by-two valve body in which opposing opening portions that are open in four directions at intervals in a circumferential direction with respect to the axis are formed and a communication passage making a pair of the opposing opening portions located on both sides in a radial direction with respect to the axis communicate with each other inside the valve body is formed.

12. The air conditioning device for a vehicle according to claim 7, wherein one of the plurality of valve bodies is a three-way valve body in which three opening portions that are open in three directions at intervals in a circumferential direction with respect to the axis are formed and a communication passage making the three opening portions communicate with each other inside the valve body is formed.

13. The air conditioning device for a vehicle according to claim 12, wherein one of the plurality of valve bodies is a two-way valve body in which two opening portions that are open in two directions at an interval in a circumferential direction with respect to the axis are formed and a communication passage making the two opening portions communicate with each other inside the valve body is formed.

14. The air conditioning device for a vehicle according to claim 12, wherein one of the plurality of valve bodies is an opposing two-by-two valve body in which opposing opening portions that are open in four directions at intervals in a circumferential direction with respect to the axis are formed and a communication passage making a pair of the opposing opening portions located on both sides in a radial direction with respect to the axis communicate with each other inside the valve body is formed.

15. The air conditioning device for a vehicle according to claim 7, wherein one of the plurality of valve bodies is a two-way valve body in which two opening portions that are open in two directions at an interval in a circumferential direction with respect to the axis are formed and a communication passage making the two third opening portions communicate with each other inside the valve body is formed.

16. The air conditioning device for a vehicle according to claim 15, wherein one of the plurality of valve bodies is an opposing two-by-two valve body in which opposing opening portions that are open in four directions at intervals in a circumferential direction with respect to the axis are formed and a communication passage making a pair of the opposing opening portions located on both sides in a radial direction with respect to the axis communicate with each other inside the valve body is formed.

17. The air conditioning device for a vehicle according to claim 7, wherein one of the plurality of valve bodies is a opposing two-by-two valve body in which opposing opening portions that are open in four directions at intervals in a circumferential direction with respect to the axis are formed and a communication passage making a pair of the opposing opening portions located on both sides in a radial direction with respect to the axis communicate with each other inside the valve body is formed.

* * * * *